(12) United States Patent
Yang et al.

(10) Patent No.: US 8,487,059 B2
(45) Date of Patent: Jul. 16, 2013

(54) SYNTHESIS OF DENDRITIC POLYOLEFINS BY METATHESIS INSERTION POLYMERIZATION

(75) Inventors: Yong Yang, Annandale, NJ (US); Andy Haishung Tsou, Allentown, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 13/302,446

(22) Filed: Nov. 22, 2011

(65) Prior Publication Data

US 2013/0131297 A1 May 23, 2013

(51) Int. Cl.
*C08G 61/12* (2006.01)
*C08F 8/04* (2006.01)
*C08F 4/80* (2006.01)

(52) U.S. Cl.
USPC ........... 526/281; 526/171; 526/308; 526/324; 525/330.3; 525/338; 525/915; 525/940; 977/754

(58) Field of Classification Search
USPC ............... 526/281, 308, 171, 324; 525/330.3, 525/338, 915; 977/754
See application file for complete search history.

(56) References Cited

U.S. PATENT DOCUMENTS

| | | | |
|---|---|---|---|
| 4,284,835 A | 8/1981 | Kim et al. | |
| 4,980,331 A | 12/1990 | Hoxmeier et al. | |
| 6,391,998 B1 | 5/2002 | Garcia-Franco et al. | |
| 6,417,281 B1 | 7/2002 | Garcia-Franco et al. | |
| 6,803,429 B2 | 10/2004 | Morgan et al. | |
| 2005/0176906 A1* | 8/2005 | Maughon et al. | 526/264 |

OTHER PUBLICATIONS

Gorodetskaya, et al, "Hyperbranched Macromolecules via Olefin Metathesis," J. Am. Chem. Soc. 2007, 129, 12672-12673.*
Tae-Lim Choi, Isaac M. Rutenberg and Robert H. Grubbs, "Synthesis of A,B-Alternating Copolymers by Ring-Opening-Insertion-Metathesis Polymerization", Angew. Chem. Int. Ed., 2002, 41 (20), pp. 3839-3841.
Mudassar Abbas and Christian Slugovc, "As low as reasonably achievable catalyst loadings in the cross metathesis of olefins with ethyl acrylate", Tetrahedron Letters, 2011, 52 (20), pp. 2560-2562.
J. Scott Parent, Aidan Bodsworth, Saurav S. Sengupta, Marianna Kontopoulou, Bharat I. Chaudhary, Drew Poche and Stephane Cousteaux, "Structure-rheology relationships of long-chain branched polypropylene: Comparative analysis of acrylic and allylic coagent chemistry", Polymer, 2009, 50 (1), pp. 85-94.
John P. Morgan, Christie Morrill and Robert H. Grubbs, "Selective Ring Opening Cross Metathesis of Cyclooctadiene and Trisubstituted Cycloolefins", Organic Letters, 2002, 4 (1), pp. 67-70.

(Continued)

*Primary Examiner* — Fred M Teskin
(74) *Attorney, Agent, or Firm* — Robert A. Migliorini (57) ABSTRACT

A one step process for making a dendritic hydrocarbon polymer, e.g., dendritic polyolefin, by metathesis insertion polymerization. The process comprises polymerizing an amount of one or more cyclic olefins and one or more multi-functional (meth)acrylates in the presence of a metathesis catalyst and under conditions sufficient to produce the dendritic hydrocarbon polymer. The one or more multi-functional (meth)acrylates have a functionality of 3 or higher. The dendritic hydrocarbon polymer can be hydrogenated to produce a substantially saturated dendritic hydrocarbon polymer. The hydrogenation can take place in the same reaction vessel as the polymerization, i.e., one pot process.

20 Claims, 8 Drawing Sheets

OTHER PUBLICATIONS

Hiroshi Tamura, Narinobu Maeda, Rumi Matsumoto, Atsushi Nakayama, Hiroki Hayashi, Kenji Ikushima and Minoru Kuraya, "Synthesis of Ester Terminated Telechelic Polymer via ADMET Polymerization", Journal of Macromolecular Science, Pure and Applied Chemistry, 1999, A36 (9), pp. 1153-1170.

H. Rachapudy, G.G. Smith, V.R. Raju and W.W. Graessley, "Properties of Amorphous and Crystallizable Hydrocarbons. III. Studies of the Hydrogenation of Polybutadiene", Journal of Polymer Science: Polymer Physics Edition, 1979, vol. 17, pp. 1211-1222.

\* cited by examiner

Fig. 11

SYNTHESIS OF DENDRITIC POLYOLEFINS BY METATHESIS INSERTION POLYMERIZATION

FIELD

This disclosure relates to a process for making dendritic hydrocarbon polymers, in particular, the synthesis of dendritic polyolefins by metathesis insertion polymerization.

BACKGROUND

Polymers that have long branches (i.e., long enough to become entangled with other polymer strands) have qualitatively different flow behavior than those which are purely linear, and this profoundly affects the processing and crystallization of these polymers. It is often desirable to incorporate an amount of polymers having long-chain-branching (LCB) into polymers to achieve particular processability and properties. Dendritic polymers can be very useful in this regard, but their synthesis can be laborious and expensive.

While LCB technology has been a part of the polyethylene industry for some time, there is still a need to further optimize the type and availability of LCB polyethylenes and other polymers. A useful, inexpensive blend additive in the form of a LCB polymer could significant impact the processing/performance balance for polyethylenes, particularly the multibillion dollar market for polyethylene films and molded articles. There could be even greater use in polypropylene, where there is currently little commercially viable technology for incorporating LCB.

Conventional polyethylenes, such as LDPE produced via high pressure free radical polymerization, typically exhibit a broad distribution of LCB. With the advent of metallocenes and other single-site coordination catalysts, there have been some products containing smaller amounts of LCB (such as Enable from EMCC, and Elite from The Dow Chemical Company).

A synthetic method used to prepare dendritic polyethylene is the anionic condensation method followed by hydrogenation. It involves four synthetic steps; synthesis of initiator precursor, initiation, anionic polymerization, and polycondensation. This synthesis has extremely low tolerance to impurities and can be stopped with the accumulation of impurities in the reactor.

It would be desirable to have a simpler and more versatile process for producing dendritic LCB polymers. It would be further desirable to have a simpler and more versatile process for producing dendritic LCB olefins.

The present disclosure also provides many additional advantages, which shall become apparent as described below.

SUMMARY

This disclosure relates in part to a one step process for making a dendritic hydrocarbon polymer by metathesis insertion polymerization. The process comprises polymerizing an amount of one or more cyclic olefins and one or more multi-functional (meth)acrylates in the presence of a metathesis catalyst and under conditions sufficient to produce the dendritic hydrocarbon polymer. The one or more multi-functional (meth)acrylates have a functionality of 3 or higher.

This disclosure also relates in part to a dendritic hydrocarbon polymer produced by the above process.

This disclosure further relates in part to a process for making a substantially saturated dendritic hydrocarbon polymer by metathesis insertion polymerization. The process comprises polymerizing an amount of one or more cyclic olefins and one or more multi-functional (meth)acrylates in the presence of a metathesis catalyst and under conditions sufficient to produce a dendritic hydrocarbon polymer. The one or more multi-functional (meth)acrylates have a functionality of 3 or higher. The dendritic hydrocarbon polymer is then hydrogenated to form the substantially saturated dendritic hydrocarbon polymer.

This disclosure yet further relates in part to a substantially saturated dendritic hydrocarbon polymer produced by the above process.

Several advantages result from the processes of this disclosure. Unlike the previously disclosed synthetic methods, the synthetic method of this disclosure constructs complex dendritic polyolefins in a single step using commercially available monomers and catalysts, i.e., a one step method. A separate hydrogenation step is necessary to deliver fully saturated polyolefins but it can be done in the same reaction vessel and solvent system, i.e., a one pot method. The method of this disclosure allows the selection of cyclic olefin monomers for designing the dendritic polyolefin backbone composition. Many cyclic olefins, including but not limited to cyclooctene, cyclooctadiene, 1,5-dimethylcyclooctadiene and norbornene (and its derivatives), can be utilized. Depending on the monomer(s) used, the final dendritic and hydrogenated polyolefins can be crystalline or amorphous. The choice for acrylic connectors is also ample. Many tri-, tetra-, and even higher multi-functional (meth)acrylates are commercially available at reasonable prices. Dendritic generations can be tailored to third or higher with a proper selection of the (meth)acrylate and cyclic monomer to (meth)acrylate ratio. In the processes of this disclosure, reactions are performed under ambient pressure with a slight heating and are tolerant to ambient environment and impurities. All monomers and solvents can be used as received without purification. In the dendritic hydrocarbon polymers, the length between two branching points is tunable, which is controlled by catalyst loading. Dendritic generation/branching density can be adjusted by catalyst loading and/or acrylic connector choice.

Further objects, features and advantages of the present disclosure will be understood by reference to the following drawings and detailed description.

DETAILED DESCRIPTION

All numerical values within the detailed description and the claims herein are modified by "about" or "approximately" the indicated value, and take into account experimental error and variations that would be expected by a person having ordinary skill in the art.

Synthesis of dendritic polymers is relatively difficult and expensive, and heretofore has not been feasible to produce commercially. The process of the present disclosure for making dendritic polymers affords synthesis at potentially lower cost than previous processes while affording a high degree of control with respect to polymer architecture. The dendritic polymers are useful as rheology-enhancing blend additives in polymer materials or compositions.

The process of this disclosure involves the synthesis, e.g., preferably one step, of dendritic polyolefins by metathesis insertion copolymerization of cyclic olefins and multi-functional (meth)acrylates in the presence of a metathesis catalyst followed by direct hydrogenation in the same reactor. Unlike previously disclosed synthetic methods, this new synthetic method constructs complex dendritic polyolefins in a single step using commercially available monomers and catalysts. A separate hydrogenation step is necessary to deliver fully saturated polyolefins, but it can be done in the same reaction vessel and solvent system, i.e., a one pot method.

The cyclic olefins useful in the processes of this disclosure can be any cyclic olefins that are capable of ring opening and polymerization in the presence of a metathesis catalyst. Illustrative cyclic olefins include, for example, cyclooctene and its derivatives, cyclooctadiene, 1,5-dimethylcyclooctadiene, norbornene and its derivatives, cyclic olefins with a suitable ring strain, bicyclic or multicyclic olefins, and the like. Cyclic olefins with sufficient ring strains for ring opening metathesis polymerization are preferred. The method of this disclosure allows the selection of cyclic olefin monomers for designing the dendritic polyolefin backbone composition. Depending on the monomer(s) used, the final dendritic and hydrogenated polyolefins can be crystalline or amorphous. The cyclic olefins are conventional materials known in the art and commercially available.

The multi-functional (meth)acrylates useful in the processes of this disclosure can be any multi-functional acrylates or methacrylates that are capable of insertion and polymerization with a cyclic olefin. Illustrative multi-functional (meth)acrylates include, for example, trimethylolpropane triacrylate (TMPTA), trimethylolpropane ethoxylate triacrylate, glycerol propoxylate (1PO/OH) triacrylate, 1,3,5-triacryloylhexahydro-1,3,5-triazine, tris[2-(acryloyloxy)ethyl] isocyanurate, pentaerythritol tetraacrylate (PETA), di(trimethylolpropane) tetraacrylate, dipentaerythritol hexaacrylate (DPEHA), and the like. The functionality of the multi-functional (meth)acrylate is 3 or higher, in order to develop higher generation, greater than second-generation, dendritic polyolefins. Many tri-, tetra-, and even higher multi-functional (meth)acrylates are commercially available at reasonable prices. Dendritic generations can be tailored to third or higher with a proper selection of the multi-functional (meth)acrylate and other reaction conditions. Dendritic generation/branching density can also be adjusted by acrylic connector choice.

The concentration of the one or more cyclic olefins and one or more multi-functional (meth)acrylates used in the process of this disclosure can vary over a wide range and need only be concentrations sufficient to form the dendritic hydrocarbon polymer. The one or more cyclic olefins and one or more multi-functional (meth)acrylates can be present in a molar concentration ratio (cyclic olefin/multi-functional (meth) acrylate) of from 2 and higher, preferably from 3 to 2000, and more preferably from 50 to 200. Dendritic generations can be tailored to third and higher with a proper selection of the cyclic olefin/multi-functional (meth)acrylate molar ratio.

For a first-generation dendritic polymer, the cyclic olefin/multi-functional (meth)acrylate molar ratio will range from 3 and higher. For a second-generation polymer, the cyclic olefin/multi-functional (meth)acrylate molar ratio will range from 2.25 and higher. For a third-generation dendritic polymer, the cyclic olefin/multi-functional (meth)acrylate molar ratio will range from 2.1 and higher. For an infinite-generation dendritic polymer, the cyclic olefin/multi-functional (meth)acrylate molar ratio will range from 2 and higher.

The metathesis catalyst can be any catalyst suitable for catalyzing the metathesis polymerization. Illustrative metathesis catalysts useful in the process of this disclosure include, for example, Grubbs $1^{st}$ generation catalyst, Grubbs $2^{nd}$ generation catalyst, Hoveyda-Grubbs catalysts, ruthenium-based metathesis catalysts, and the like. The catalysts are conventional materials known in the art and commercially available.

The concentration of the metathesis catalyst used in the process of this disclosure can vary over a wide range and need only be a concentration sufficient to catalyze the polymerization. The metathesis catalyst can be present in an amount of from 0.00001 M to 1 M, preferably from 0.0001 M to 0.1 M, and more preferably from 0.001 M to 0.01 M.

In the dendritic hydrocarbon polymers of this disclosure, the length between two branching points is tunable, which is controlled by catalyst loading. Dendritic generation/branching density can be adjusted by catalyst loading and/or acrylic connector choice.

Figure 4:
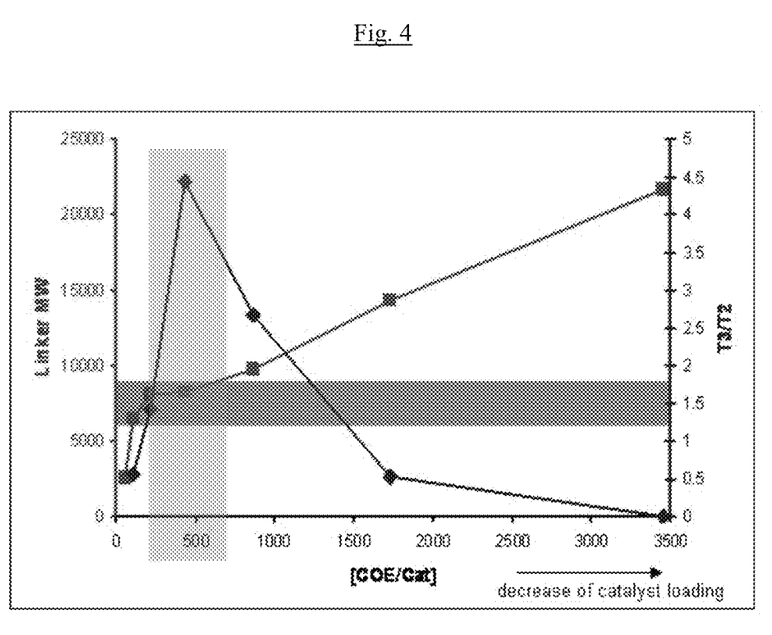
FIG. 4 depicts linker molecular weight (red) and insertion efficiency T3/T2 (blue) versus catalyst loading (Cyclooctene/Catalyst) for Example 1 herein.

The average linker length and insertion efficiency can be controlled by the catalyst loading. As illustrated in FIG. 4, linker length increases with the decrease of catalyst loading. At the same time, a high full insertion ratio can be achieved at a certain catalyst loading. The relationships shown in FIG. 4 can also guide the synthesis of dendritic structures with desired linker length and dendritic generation (or degree of hyperbranching).

Figure 1:
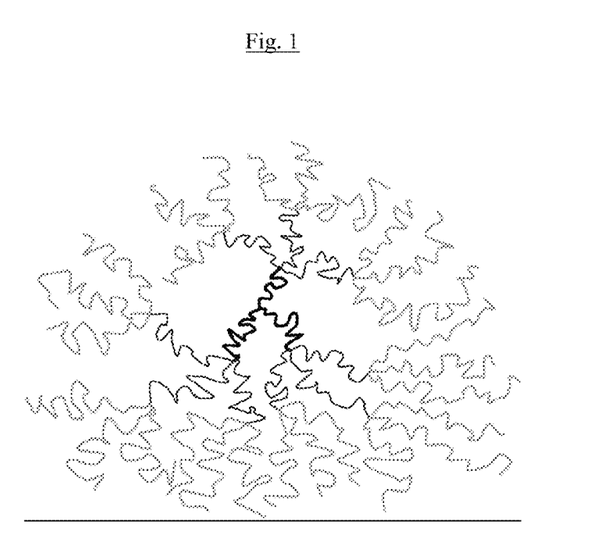
FIG. 1 depicts an illustrative 3rd generation dendritic structure.

The dendritic polyolefins prepared by the process of this disclosure preferably have a dendritic generation of 2 and higher and have molecular weight between 5,000 to 5,000,000, and most preferably between 10,000 and 1,000,000. Illustrative dendritic polyolefins prepared by the process of this disclosure is shown in FIG. 1.

In one embodiment, the dendritic structure is a dendritic structure of at least generation 2. In another embodiment, the dendritic structure is a dendritic structure of at least generation 3.

The crystalline dendritic polyolefins of this disclosure can be used as a processability additive in a semi-crystalline polyolefin of similar backbone composition for delivering extensional strain hardening, higher melt strength, and faster blown film processing speed at a concentration of 0.1 to 20 wt %, more preferably 0.25 to 15 wt %, and most preferably 0.5 to 10 wt %. The amorphous dendritic polyolefins of this disclosure can be used as a processability additive in an elastomeric polyolefin of similar backbone composition for delivering extensional hardening and higher melt strength for better compounding processability and cold flow resistance at a concentration of 0.1 to 20 wt %, more preferably 0.25 to 15 wt %, and most preferably 0.5 to 10 wt %. This amorphous dendritic polyolefin can also be used as a viscosity index improver in lubricants due to its temperature invariant solution coil dimension and its shear stability at a concentration of 0.01 to 7.5 wt %, more preferably 0.1 to 5 wt %, and most preferably 0.3 to 3 wt %.

Dendritic polyolefins of this disclosure with second and higher generations are unique processability additives in polyolefins for delivering extensional strain hardening, melt strength, and higher blown film processing speed. As described herein, dendritic polyethylenes of second generation or higher have been prepared by anionic polymerization and anionic condensation followed by hydrogenation. Both anionic polymerization and anionic condensation methods involve more than three synthetic steps including the synthesis of the di-functional initiator and one hydrogenation step. Additionally, anionic methods are sensitive to impurities and reactions can be slow or stopped with accumulation of impurities. In the process of this disclosure, a one step synthetic method has been developed for preparing dendritic polyolefins before hydrogenation based on metathesis insertion copolymerization of cyclic olefins and multi-functional (meth)acrylates that have 3 or more functionalities. The dendritic polyolefin backbone composition, the molecular weight of the linker in between branching points, and the dendritic generation can be tailored based on the selection of cyclic olefin monomer, catalyst amount, cyclic olefin to multi-functional (meth)acrylate molar ratio, and the number of functionality on the (meth)acrylate. Additionally, hydrogenation can be carried out in the same reactor immediately following the polymerization, to furnish fully saturated polyolefins. Various commercial cyclic olefins and multi-functional (meth)acrylates can be directly utilized in the synthesis, to yield dendritic polyolefins of desirable structures.

Polymerization conditions for the reaction of the one or more cyclic olefins and one or more multi-functional (meth) acrylates, such as temperature, pressure and contact time, may also vary greatly and any suitable combination of such conditions may be employed herein. The reaction temperature may range between −40° C. to 120° C., and preferably between 15° C. to 100° C., and more preferably between 20° C. to 80° C. Normally the reaction is carried out under ambient pressure and the contact time may vary from a matter of seconds or minutes to a few hours or greater. The reactants can be added to the reaction mixture or combined in any order. The stir time employed can range from 3 minutes to 168 hours, preferably from 10 minutes to 72 hours, and more preferably from 30 minutes to 6 hours.

In this synthetic method, reactions are performed under ambient pressure with a slight heating and are tolerant to ambient environment and impurities. All monomers and solvents can be used as received without purification.

Hydrogenation can be carried out in the process of the present disclosure by any known catalysis system, including heterogeneous systems and soluble systems. Soluble systems are disclosed in U.S. Pat. No. 4,284,835 at column 1, line 65 through column 9, line 16 as well as U.S. Pat. No. 4,980,331 at column 3 line 40 through column 6, line 28.

For purposes of the present disclosure, "substantially saturated" as it refers to the dendritic hydrocarbon polymer means that polymer includes on average fewer than 10 double bonds, or fewer than 5 double bonds, or fewer than 3 double bonds, or fewer than 1 double bond per 100 carbons in a hydrocarbon polymer chain.

Additional teachings to hydrogenation are disclosed in Rachapudy et al., Journal of Polymer Science: Polymer Physics Edition, Vol. 17, 1211-1222 (1979), which is incorporated herein by reference in its entirety. Table 1 of the article discloses several systems including palladium on various supports (calcium carbonate, but also barium sulfide). The Rachapudy et al. article discloses preparation of homogeneous catalysts and heterogeneous catalysts.

The Rachapudy et al. article discloses a method of preparation of a homogeneous catalyst. The catalyst can be formed by reaction between a metal alkyl and the organic salt of a transition metal. The metal alkyls were n-butyl lithium (in cyclohexane) and triethyl aluminum (in hexane). The metal salts were cobalt and nickel 2-ethyl hexanoates (in hydrocarbon solvents) and platinum and palladium acetyl-acetonates (solids). Hydrogenation was conducted in a 1-liter heavy-wall glass reactor, fitted with a stainless steel flange top and magnetically stirred. A solution of 5 grams of polybutadiene in 500 milliliters of dry cyclohexane was added, and the reactor was closed and purged with nitrogen. The catalyst complex was prepared separately by adding the transition metal salt to the metal alkyl in cyclohexane under nitrogen. The molar ratio of component metals (alkyl to salt) was generally 3.5/1, the optimum in terms of rate and completeness of hydrogenation. The reactor was heated to 70° C., purged with hydrogen, and the catalyst mixture (usually 0.03 moles of transition metal per mole of double bonds) injected through a rubber septum. Hydrogen pressure was increased to 20 psi (gauge) and the reaction allowed to proceed for approximately 4 hours. Hydrogenation proceeds satisfactorily in the initial stages even at room temperature, but the partially hydrogenated polymer soon begins to crystallize. At 70° C., the polymer remains in solution throughout the reaction.

After hydrogenation the catalyst was decomposed with dilute HCl. The polymer was precipitated with methanol, washed with dilute acid, re-dissolved, re-precipitated and dried under vacuum. Blank experiments with polyethylene in place of polybutadiene confirmed that the washing procedure was sufficient to remove any uncombined catalyst decomposition products.

The Rachapudy et al. article also discloses a method of preparation of a heterogeneous catalyst. A 1-liter high-pressure reactor (Parr Instrument Co.) was used. The catalysts were nickel on kieselguhr (Girdler Co.) and palladium on calcium carbonate (Strem Chemical Co.). Approximately 5 grams of polybutadiene were dissolved in 500 milliliters of dry cyclohexane, the catalyst was added (approximately 0.01 moles metal/mole of double bonds), and the reactor was purged with hydrogen. The reactor was then pressurized with hydrogen and the temperature raised to the reaction temperature for 3 to 4 hours. For the nickel catalyst, the reaction conditions were 700 psi $H_2$ and 160° C. For palladium, the conditions were 500 psi $H_2$ and 70° C.

After reaction the hydrogen was removed and the solution filtered at 70° C. The polymer was precipitated with methanol and dried under vacuum.

Additional teachings to hydrogenation processes and catalysts therefor are disclosed in U.S. Pat. Nos. 4,284,835 and 4,980,331, both of which are incorporated herein by reference in their entirety.

The catalysts described herein can be used to hydrogenate hydrocarbons containing unsaturated carbon bonds. The unsaturated carbon bonds which may be hydrogenated include olefinic and acetylenic unsaturated bonds. The process is particularly suitable for the hydrogenation under mild conditions of hydrogenatable organic materials having carbon-to-carbon unsaturation, such as acyclic monoolefins and polyolefins, cyclic monoolefins and polyolefins and mixtures thereof. These materials may be unsubstituted or substituted with additional non-reactive functional groups such as halogens, ether linkages or cyano groups. Exemplary of the types of carbon-to-carbon compounds useful herein are hydrocarbons of 2 to 30 carbon atoms, e.g., olefinic compounds selected from acyclic and cyclic mono-, di- and triolefins. The catalysts of this disclosure are also suitable for hydrogenating carbon-to-carbon unsaturation in polymeric materials, for example, in removing unsaturation from butadiene polymers and co-polymers such as styrene-butadiene-styrene.

The hydrogenation reaction herein is normally accomplished at a temperature from 40° C. to 160° C. and preferably from 60° C. to 150° C. Different substrates being hydrogenated will require different optimum temperatures, which can be determined by experimentation. The initial hydrogenation pressures may range up to 3,000 psi partial pressure, at least part of which is present due to the hydrogen. Pressures from 1 to 7500 psig are suitable. Preferred pressures are up to 2000 psig, and most preferred pressures are from 100 to 1000 psig are employed. The reactive conditions are determined by the particular choices of reactants and catalysts. The process may be either batch or continuous. In a batch process, reaction times may vary widely, such as between 0.01 second to 10 hours. In a continuous process, reaction times may vary from 0.1 seconds to 120 minutes and preferably from 0.1 second to 10 minutes.

The ratio of catalyst to material being hydrogenated is generally not critical and may vary widely within the scope of the disclosure. Molar ratios of catalyst to material being hydrogenated between 1:1000 and 10:1 are found to be satisfactory; higher and lower ratios, however, are possible.

If desired, the hydrogenation process may be carried out in the presence of an inert diluent, for example a paraffinic or cycloparaffinic hydrocarbon.

Additional teachings to hydrogenation processes and catalysts therefor are disclosed in U.S. Pat. No. 4,980,331, which is incorporated herein by reference in its entirety.

In general, any of the Group VIII metal compounds known to be useful in the preparation of catalysts for the hydrogenation of ethylenic unsaturation can be used separately or in combination to prepare the catalysts. Suitable compounds, then, include Group VIII metal carboxylates having the formula $(RCOO)_n M$, wherein M is a Group VIII metal, R is a hydrocarbyl radical having from 1 to 50 carbon atoms, preferably from 5 to 30 carbon atoms, and n is a number equal to the valence of the metal M; alkoxides having the formula $(RCO)_n M$, wherein M is again a Group VIII metal, R is a hydrocarbon radical having from 1 to 50 carbon atoms, preferably from 5 to 30 carbon atoms, and n is a number equal to the valence of the metal M; chelates of the metal prepared with beta-ketones, alpha-hydroxycarboxylic acids beta-hydroxycarboxylic acids, beta-hydroxycarbonyl compounds and the like; salts of sulfur-containing acids having the general formula $M(SO_x)_n$ and partial esters thereof; and salts of aliphatic and aromatic sulfonic acids having from 1 to 20 carbon atoms. Preferably, the Group VIII metal will be selected from the group consisting of nickel and cobalt. Most preferably, the Group VIII metal will be nickel.

The metal carboxylates useful in preparing the catalyst include Group VIII metal salts of hydrocarbon aliphatic acids, hydrocarbon cycloaliphatic acids and hydrocarbon aromatic acids. Examples of hydrocarbon aliphatic acids include hexanoic acid, ethylhexanoic acid, heptanoic acid, octanoic acid, nonanoic acid, decanoic acid, dodecanoic acid, myristic acid, palmitic acid, stearic acid, oleic acid, linoleic acid, and rhodinic acid. Examples of hydrocarbon aromatic acids include benzoic acid and alkyl-substituted aromatic acids in which the alkyl substitution has from 1 to 20 carbon atoms. Examples of cycloaliphatic acids include naphthenic acid, cyclohexylcarboxylic acid, and abietic-type resin acids. Suitable chelating agents which may be combined with various Group VIII metal compounds thereby yielding a Group VIII metal chelate compound useful in the preparation of the catalyst include beta-ketones, alpha-hydroxycarboxylic acids, beta-hydroxy carboxylic acids, and beta-hydroxycarbonyl compounds. Examples of beta-ketones that may be used include acetylacetone, 1,3-hexanedione, 3,5-nonadione, methylacetoacetate, and ethylacetoacetate. Examples of alpha-hydroxycarboxylic acids that may be used include lactic acid, glycolic acid, alpha-hydroxyphenylacetic acid, alpha-hydroxy-alpha-phenylacetic acid, and alpha-hydroxycyclohexylacetic acid. Examples of beta-hydroxycarboxylic acids include salicylic acid, and alkyl-substituted salicyclic acids. Examples of beta-hydroxylcarbonyl compounds that may be used include salicylaldehyde, and θ-hydroxyacetophenone. The metal alkoxides useful in preparing the catalysts include Group VIII metal alkoxides of hydrocarbon aliphatic alcohols, hydrocarbon cycloaliphatic alcohols and hydrocarbon aromatic alcohols. Examples of hydrocarbon aliphatic alcohols include hexanol, ethylhexanol, heptanol, octanol, nonanol, decanol, and dodecanol. The Group VIII metal salts of sulfur-containing acids and partial esters thereof include Group VIII metal salts of sulfonic acid, sulfuric acid, sulphurous acid, and partial esters thereof. Of the sulfonic acids, aromatic sulfonic acids such as benzene sulfonic acid, p-toluene sulfonic acid, are particularly useful.

In general, any of the alkylalumoxane compounds known to be useful in the preparation of olefin polymerization catalysts may be used in the preparation of the hydrogenation catalyst. Alkylalumoxane compounds useful in preparing the catalyst may, then, be cyclic or linear. Cyclic alkylalumoxanes may be represented by the general formula $(R-Al-O)$, while linear alkylalumoxanes may be represented by the general formula $R(R-Al-O)_n AlR_2$. In both of the general formulae R will be an alkyl group having from 1 to 8 carbon atoms such as, for example, methyl, ethyl, propyl, butyl, and pentyl, m is an integer from 3 to 40, and n is an integer from 1 to 40. In a preferred embodiment, R will be methyl, m will be a number from 5 to 20 and n will be a number from 10 to 20. As is well known, alkylalumoxanes may be prepared by reacting an aluminum alkyl with water. Usually the resulting product will be a mixture of both linear and cyclic compounds.

Contacting of the aluminum alkyl and water may be accomplished in several ways. For example, the aluminum alkyl may first be dissolved in a suitable solvent such as toluene or an aliphatic hydrocarbon and the solution then contacted with a similar solvent containing relatively minor amounts of moisture. Alternatively, an aluminum alkyl may be contacted with a hydrated salt, such as hydrated copper sulfate or ferrous sulfate. When this method is used, a hydrated ferrous sulfate is frequently used. According to this method, a dilute solution of aluminum alkyl in a suitable solvent such as toluene is contacted with hydrated ferrous sulfate. In general, 1 mole of hydrated ferrous sulfate will be contacted with from 6 to 7 moles of the aluminum trialkyl. When aluminum trimethyl is the aluminum alkyl actually used, methane will be evolved as conversion of the aluminum alkyl to an alkylalumoxane occurs.

In general, any of the Group Ia, IIa or IIIa metal alkyls or hydrides known to be useful in preparing hydrogenation catalysts in the prior art may be used to prepare the catalyst. In general, the Group Ia, IIa or IIIa metal alkyls will be peralkyls with each alkyl group being the same or different containing from 1 to 8 carbon atoms and the hydrides will be perhydrides although alkylhydrides should be equally useful. Aluminum, magnesium and lithium alkyls and hydrides are particularly useful and these compounds are preferred for use in preparing the catalyst. Aluminum trialkyls are most preferred.

The one or more alkylalumoxanes and the one or more Group Ia, IIa or IIIa metal alkyls or hydrides may be combined and then contacted with the one or more Group VIII metal compounds or the one or more alkylalumoxanes and the one or more Group Ia, IIa or IIIa metal alkyls or hydrides may be sequentially contacted with the one or more Group VIII metal compounds with the proviso that when sequential contacting is used, the one or more alkylalumoxanes will be first contacted with the one or more Group VIII metal compounds. Sequential contacting is preferred. With respect to the contacting step the two different reducing agents; i.e., the alkylalumoxanes and the alkyls or hydrides, might react with the Group VIII metal compound in such a way as to yield different reaction products. The Group Ia, IIa and IIIa metal alkyls and hydrides are a stronger reducing agent than the alkylalumoxanes, and, as a result, if the Group VIII metal is allowed to be completely reduced with a Group Ia, IIa or IIIa metal alkyl or hydride, the alkylalumoxanes might make little or no contribution. If the Group VIII metal is first reduced with one or more alkylalumoxanes however, the reaction product obtained with the alumoxane might be further reduced or otherwise altered by reaction with a Group Ia, IIa or IIIa metal alkyl or hydride.

Whether contacting is accomplished concurrently or sequentially, the one or more alkylalumoxanes will be combined with the one or more Group VIII metal compounds at a concentration sufficient to provide an aluminum to Group VIII metal atomic ratio within the range from 1.5:1 to 20:1 and the one or more Group Ia, IIa or IIIa metal alkyls or hydrides will be combined with one or more Group VIII metal compounds at a concentration sufficient to provide a Group Ia, IIa or IIIa metal to Group VIII metal atomic ratio within the range from 0.1:1 to 20:1. Contact between the one or more Group VIII compounds and the one or more alkylalumoxanes and the one or more alkyls or hydrides will be accomplished at a temperature within the range from 20° C. and 100° C. Contact will typically be continued for a period of time within the range from 1 to 120 minutes. When sequential contacting is used, each of the two contacting steps will be continued for a period of time within this same range.

In general, the hydrogenation catalyst will be prepared by combining the one or more Group VIII metal compounds with the one or more alkylalumoxanes and the one or more Group Ia, IIa or IIIa metal alkyls or hydrides in a suitable solvent. In general, the solvent used for preparing the catalyst may be anyone of those solvents known in the prior art to be useful as solvents for unsaturated hydrocarbon polymers. Suitable solvents include aliphatic hydrocarbons, such as hexane, heptane, and octane, cycloaliphatic hydrocarbons such as cyclopentane, and cyclohexane, alkyl-substituted cycloaliphatic hydrocarbons such as methylcyclopentane, methylcyclohexane, and methylcyclooctane, aromatic hydrocarbons such as benzene, hydroaromatic hydrocarbons such as decalin and tetralin, alkyl-substituted aromatic hydrocarbons such as toluene and xylene, halogenated aromatic hydrocarbons such as chlorobenzene, and linear and cyclic ethers such as the various dialkyl ethers, polyethers, particularly diethers, and tetrahydrofuran. Suitable hydrogenation catalysts will usually be prepared by combining the catalyst components in a separate vessel prior to feeding the same to the hydrogenation reactor.

In the above detailed description, the specific embodiments of this disclosure have been described in connection with its preferred embodiments. However, to the extent that the above description is specific to a particular embodiment or a particular use of this disclosure, this is intended to be illustrative only and merely provides a concise description of the exemplary embodiments. Accordingly, the disclosure is not limited to the specific embodiments described above, but rather, the disclosure includes all alternatives, modifications, and equivalents falling within the true scope of the appended claims. Various modifications and variations of this disclosure will be obvious to a worker skilled in the art and it is to be understood that such modifications and variations are to be included within the purview of this application and the spirit and scope of the claims.

The following are examples of the present disclosure and are not to be construed as limiting.

EXAMPLES

All reactions in the following examples were performed using as-received starting materials without any purification.

Example 1

Figure 2:
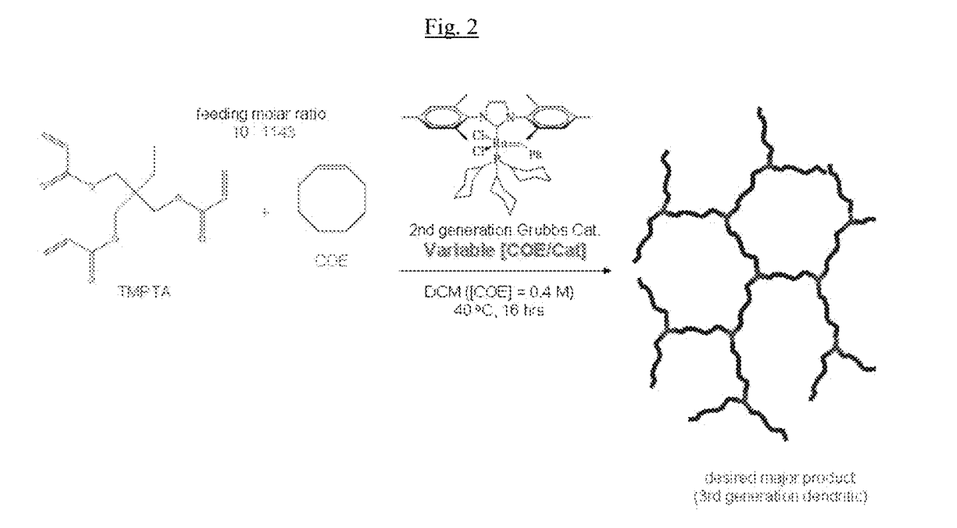
FIG. 2 depicts the reaction scheme of Example 1 herein.

A reaction flask was charged with trimethylolpropane triacrylate (TMPTA) and cyclooctene (COE) at a molar ratio of 10:1143. An appropriate amount of dichloromethane (DCM) was then added to make the concentration of COE as 0.4 M. The solution was stirred by a magnetic stirrer. A small volume of Grubbs 2nd generation catalyst solution in DCM (1 milliliter) was prepared and injected into the stirred monomer solution. The reaction mixture was stirred at 40° C. under slow nitrogen flow for 16 hours before it was quenched by several drops of ethyl vinyl ether. Silica gel was then added and the mixture was stirred overnight at room temperature. The reaction mixture was filtered and the filtrate was concentrated followed by precipitation to methanol. The reaction scheme is shown in FIG. 2.

Figure 3:
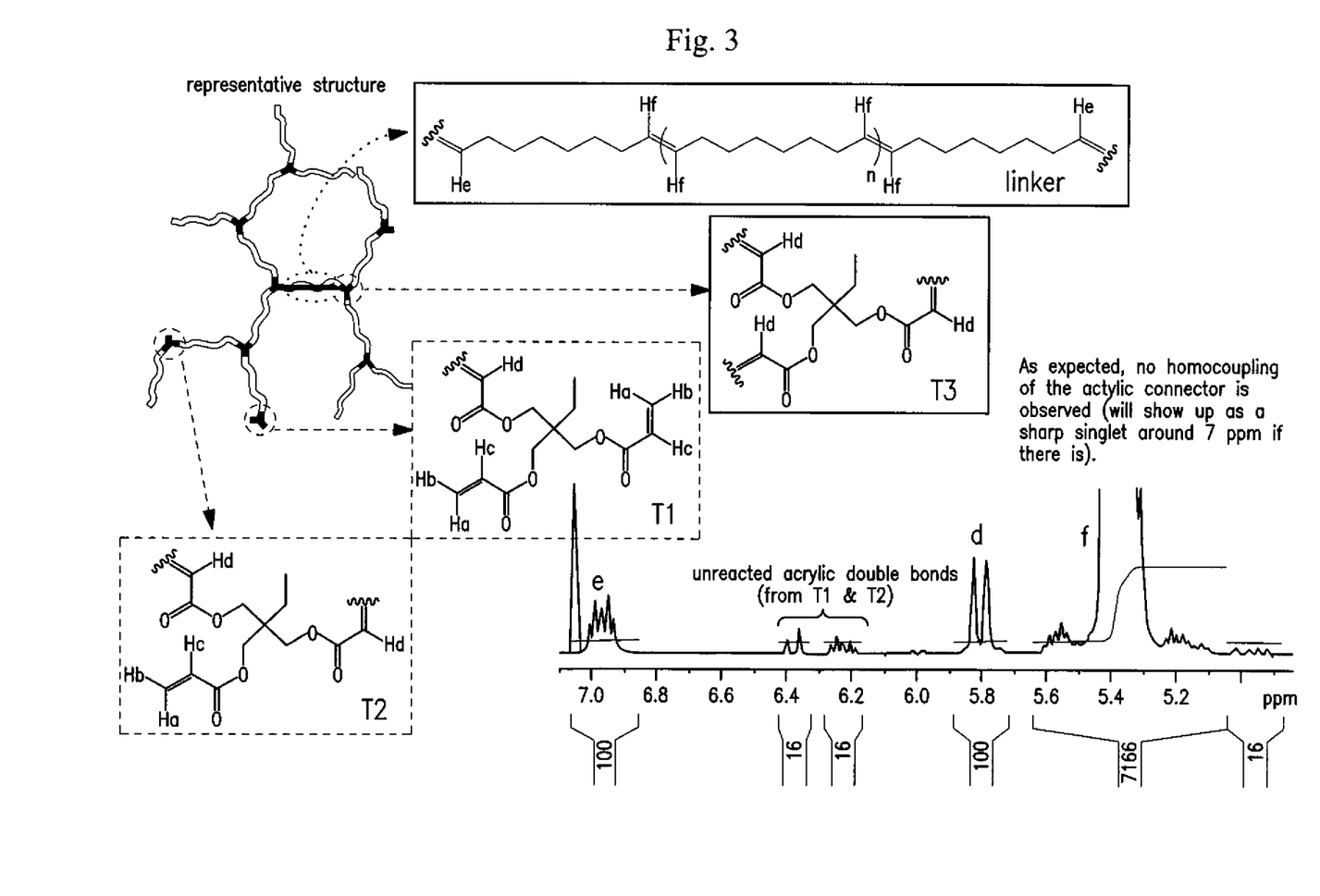
FIG. 3 shows a representative structure of dendritic polymer synthesized and corresponding $^1$H NMR spectrum for Example 1 herein.

The polymer product was received after filtration and drying as an off-white solid with high yields. The structure of the polymer was determined by $^1$H NMR as shown in FIG. 3. In this Example, a series of catalyst loadings ([COE/Catalyst] varied from 54 to 3456) were examined and the relationships between linker length, insertion efficiency (measured by T3/T2) and catalyst loading are illustrated in FIG. 4.

In FIG. 3, $^1$H NMR clearly shows the signature pair of protons e and d, indicating the new double bond formed between the acrylic connector and polycyclooctene linker. No homocoupled acrylic connectors were observed. There was a small amount of unreacted acrylic double bonds, implying some acrylic connectors were partially inserted into the linkers (T2) and some were at the chain ends (T1). A full insertion means all the three double bonds of a TMPTA molecule were reacted (T3) and it is the desired pathway to dendritic structures. The average linker length was calculated by the integral ratio of protons f and d. It is unable to distinguish T1 and T2 from $^1$H NMR. In order to estimate the insertion efficiency, an assumption was made that all the partially inserted TMPTA molecules were T2-type. The T3/T2 ratio was then used as the indication of insertion efficiency. Higher T3/T2 means more fully inserted connectors and thus more completed dendritic structures. This is a conservative estimation because less T1 (a T1 moiety has 2 unreacted acrylic double bonds) is needed to account for the same amount of terminal acrylic double bonds than T2 (a T2 moiety has only 1 unreacted acrylic double bond). If the insertion efficiency is calculated as T3/(T2+T1), the value will be higher than T3/T2.

The series of reactions performed in this Example demonstrates that one can control the average linker length and insertion efficiency simply by adjusting the catalyst loading. As illustrated in FIG. 4, linker length increases along with the decrease of catalyst loading. At the same time, a high full insertion ratio can be achieved at a certain catalyst loading. The relationships shown in FIG. 4 can also guide the synthesis of dendritic structures with desired linker length and dendritic generation (or degree of hyperbranching).

Example 2

Figure 5:
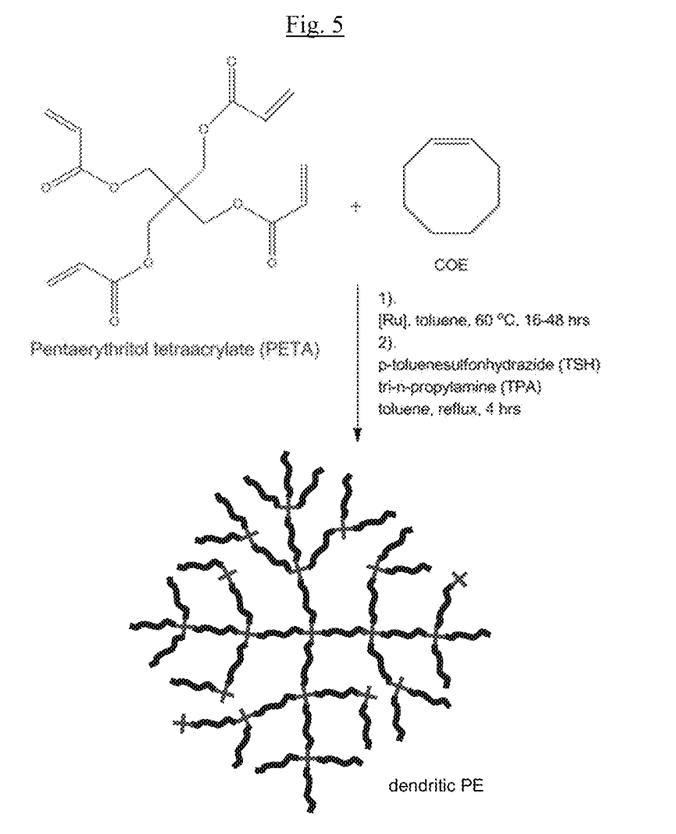
FIG. 5 depicts the reaction scheme of Example 2 herein.

A reaction flask was charged with 60 mmol cyclooctene (COE), 0.363 mmol pentaerythritol tetraacrylate (PETA) and 20 milliliters of toluene. The solution was stirred by a magnetic stirrer. A small volume of 85 milligrams of Grubbs 2nd generation catalyst solution in toluene (1 milliliter) was prepared and injected into the stirred monomer solution. The reaction mixture was stirred at 60° C. under slow nitrogen flow for 16-48 hours before it was quenched by several drops of ethyl vinyl ether. During the synthesis, no gels were formed. A small amount of reaction mixture was taken out by syringe and dried for NMR and GPC analyses. To the same reaction flask, excess p-toluenesulfonhydrazide (TSH, normally 3 equivalents to olefins), 10-40 milligrams BHT, and 150 milliliters toluene were added. The mixture was heated to reflux followed by an injection of excess tri-n-propylamine (TPA, normally 3 equivalents to olefins). After refluxing for 4 hours, the mixture was poured into 1.5 liter methanol while it was still hot. The white precipitate was filtered and washed with 100 milliliters of methanol three times. The reaction scheme is shown in FIG. 5.

The fully hydrogenated dendritic polyethylene (PE), DPEY, was received as white solid with high yields. The polymer before hydrogenation was soluble in $CDCl_3$ at room temperature and the polymer after hydrogenation was soluble in o-dichlorobenzene-$d_4$ (o-DCB-$d_4$) at elevated temperatures (100° C.). The two $^1H$ NMR spectra were stacked in FIG. 6 for comparison.

Figure 6:
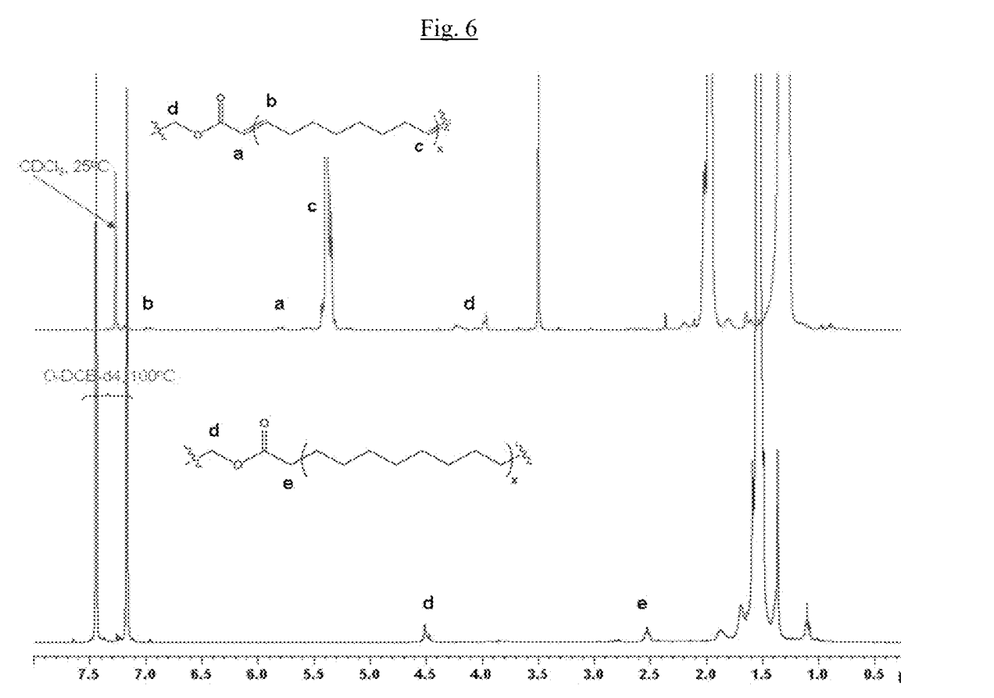
FIG. 6 shows $^1$H NMR spectra of the dendritic polymer of Example 2 herein before hydrogenation (red) and after hydrogenation (blue) with peak assignments.

As shown in FIG. 6, in the unsaturated polymer (red spectrum), PETA molecules were almost all fully inserted, indicated by protons a and b and negligible unreacted terminal acrylic double bonds. After hydrogenation (blue spectrum), all the alkene protons disappeared and ester linkages preserved. GPC analysis showed the unsaturated polymer had Mw of 246 kDa and PDI of 12.6 (refractive index detector with reference to polyisobutylene standards), and the fully hydrogenated dendritic PE, DPEY, had Mw of 200 kDa and PDI of 10 (light scattering detector with reference to linear polyethylene standards). The branching index g' of DPEY was found to be 0.42 by GPC-3D, suggesting a highly branched structure. The mass recovery of GPC was nearly quantitative, indicating no gel presence in the synthesis. Differential Scanning Calorimetry (DSC) showed the melting point of the dendritic PE was 128° C. and its crystallinity was 66%. This synthesis can be scaled up to kilogram scale by utilizing large reaction vessel and mechanical stirrer. The same reaction performed by utilizing a mechanical stirrer yielded a dendritic PE with the same chemical composition but higher molecular weight and lower branching index. The fully hydrogenated dendritic PE, DPEY2, synthesized by mechanical stirring had Mw of 327 kDa (light scattering detector with reference to linear polyethylene standards). Its branching index g' was determined to be 0.31 by GPC-3D, indicating an even higher branched structure. DSC showed the melting point of DPEY2 is 127° C. and its crystallinity is 67%.

Figure 7:
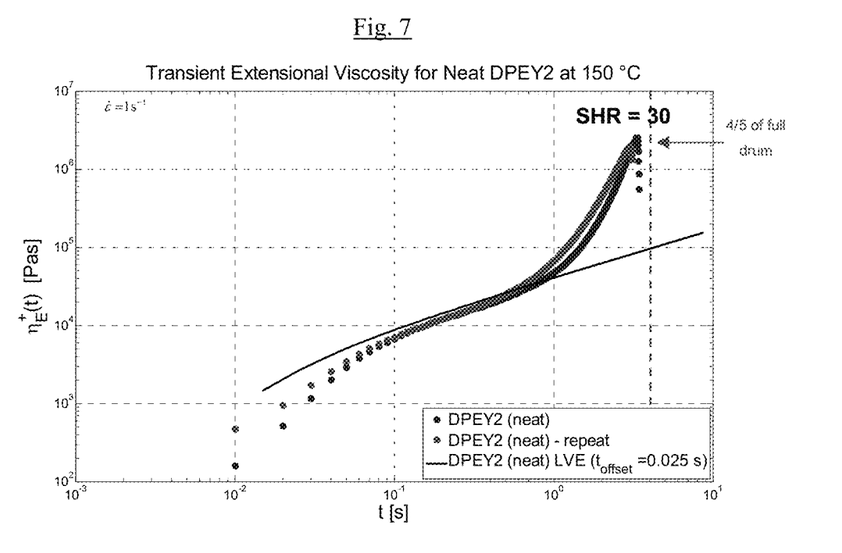
FIG. 7 shows that the neat dendritic PE synthesized exhibits extensional hardening as measured by SER (Sentmanat Extensional Rheometer).

The dendritic PEs demonstrated excellent thermal stability confirmed by both Thermal Gravimetric Analysis (TGA) and rheology. As shown in the FIG. 7, DPEY2 exhibits extensional hardening with a large strain hardening ratio (SHR) of 30.

Figure 8:
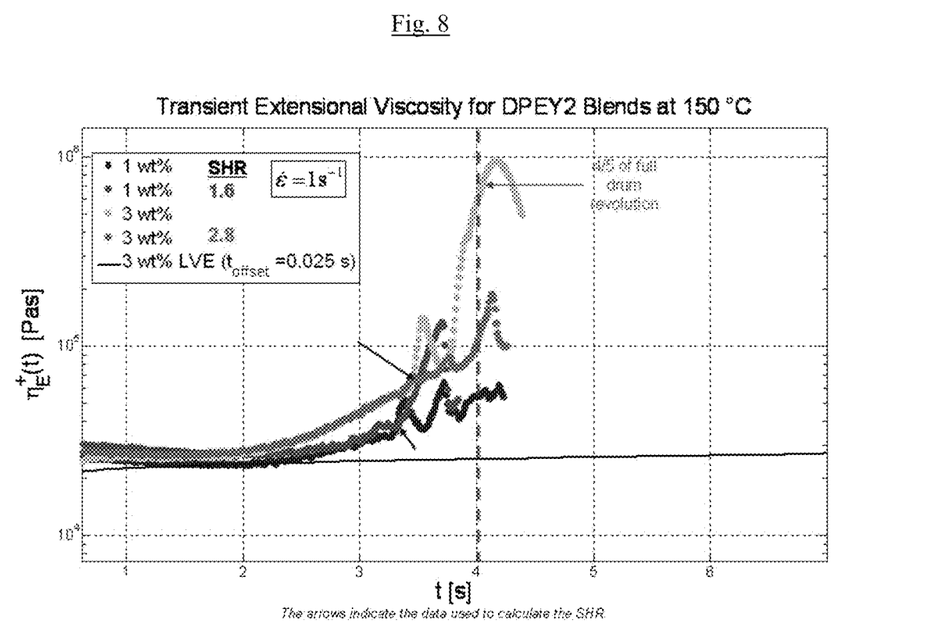
FIG. 8 shows that extensional strain hardening can be observed in Exceed LLDPE containing 1% and 3% dendritic PE additives as measured by SER (Sentmanat Extensional Rheometer).

When Exceed Linear Low Density Polyethylene (LLDPE) was blended with DPEY2 at 1 wt % and 3 wt %, extensional hardening can be found in Exceed blends, as shown in the FIG. 8, in contrast to the observation that no extensional hardening can be seen in Exceed.

Figure 9:
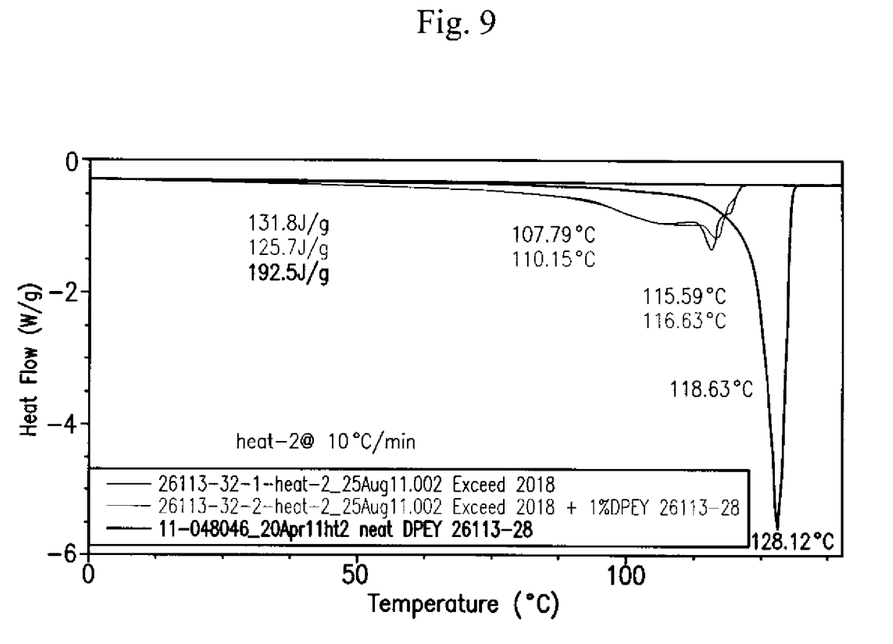
FIG. 9 shows overlaid DSC (Differential Scanning calorimetry) traces of Exceed LLDPE film, neat dendritic PE, and Exceed containing 1% dendritic PE additive.

DSC traces of DPEY, Exceed LLDPE and Exceed containing 1% DPEY are shown in FIG. 9. Addition of DPEY in Exceed at 1% did not alter or affect the Exceed crystallization behavior. Both DPEY and DPEY2 are miscible and compatible with LLDPE and are able to co-crystallize with LLDPE.

Example 3

Figure 10:
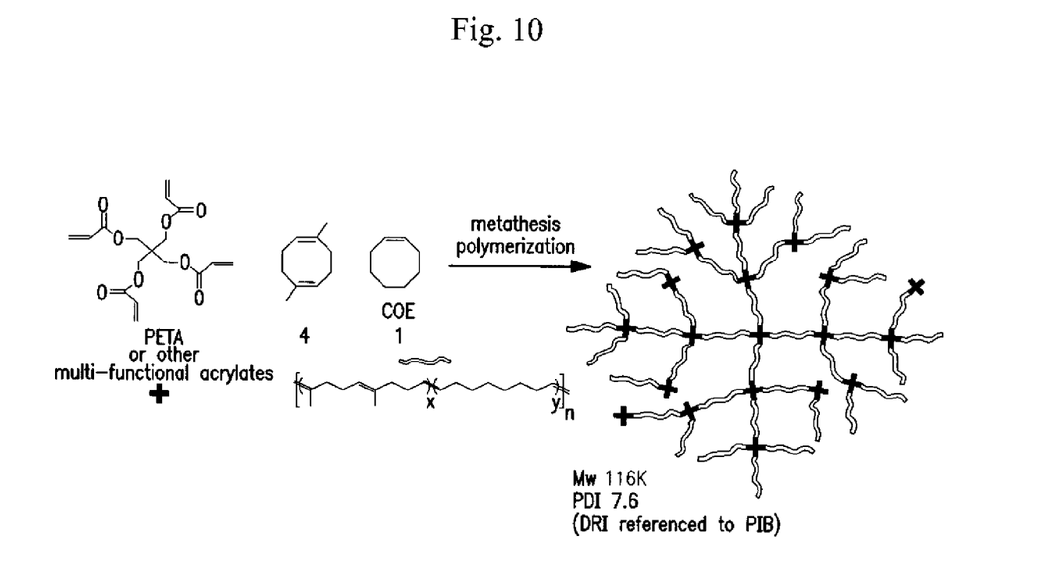
FIG. 10 depicts the reaction scheme of Example 3 herein.

A reaction flask was charged with 12 mmol cyclooctene (COE), 48 mmol 1,5-dimethylcyclooctadiene (DMCOD), 0.363 mmol tetraacrylate PETA and 17 milliliters of toluene. The solution was stirred by a magnetic stirrer. A small volume of 85 milligrams of Grubbs 2nd generation catalyst solution in toluene (1 milliliter) was prepared and injected into the stirred monomer solution. The reaction mixture was stirred at 60° C. under slow nitrogen flow for 16-48 hours before it was quenched by several drops of ethyl vinyl ether. Silica gel was then added and the mixture was stirred overnight at room temperature. The reaction mixture was filtered and the filtrate was concentrated followed by precipitation to methanol. The reaction scheme is shown in FIG. 10.

Figure 11:
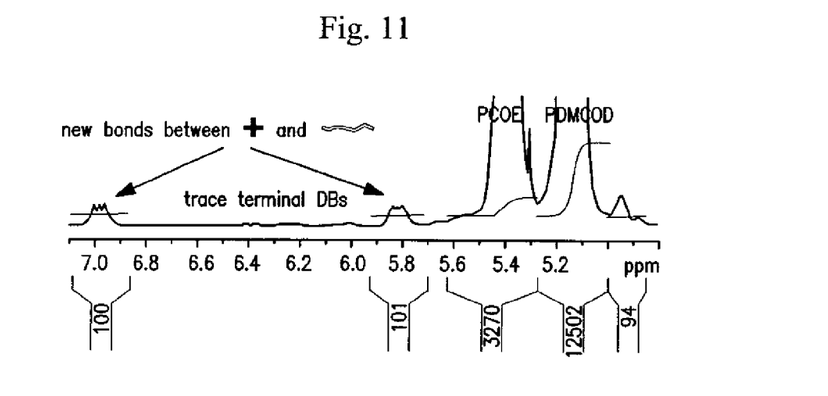
FIG. 11 shows $^1$H NMR partial spectrum of Example 3 herein before hydrogenation with peak assignments.

The polymer product was received after filtration and drying as an off-white gummy solid with high yields. The structure of the polymer was determined by $^1H$ NMR as shown in FIG. 11.

GPC analysis showed the unsaturated polymer had Mw of 116 kDa and PDI of 7.6 (refractive index detector with reference to polyisobutylene standards). DSC showed no obvious melting point. As shown in FIG. 11, $^1H$ NMR confirmed almost all the PETA connectors were fully inserted into the copolymer of COE and DMCOD. After hydrogenation, an amorphous 50/50 (wt/wt) dendritic EP copolymer is expected and can be used as a viscosity index improver in lubricant oils. The synthesis can be scaled up to kilogram scale by utilizing large reaction vessel and mechanical stirrer. To make amorphous dendritic POs, cyclic olefins other than DMCOD, such as norbornene or its derivatives, can be employed.

PCT and EP Clauses:

1. A one step process for making a dendritic hydrocarbon polymer by metathesis insertion polymerization, said process comprising:
polymerizing an amount of one or more cyclic olefins and one or more multi-functional (meth)acrylates, said one or more multi-functional (meth)acrylates having a functionality of 3 or higher, in the presence of a metathesis catalyst and under conditions sufficient to produce said dendritic hydrocarbon polymer 2. The process of clause 1 wherein the dendritic hydrocarbon polymer is a dendritic polyolefin.

3. The process of clauses 1 and 2 wherein the one or more cyclic olefins are selected from cyclooctene and its derivatives, cyclooctadiene, 1,5-dimethylcyclooctadiene, norbornene and its derivatives, a cyclic olefin with a sufficient ring strain for ring opening metathesis polymerization, and a bicyclic or multicyclic olefin, and the one or more multi-functional (meth)acrylates are selected from trimethylolpropane triacrylate (TMPTA), trimethylolpropane ethoxylate triacrylate, glycerol propoxylate (1PO/OH) triacrylate, 1,3,5-triacryloylhexahydro-1,3,5-triazine, tris[2-(acryloyloxy)ethyl] isocyanurate, pentaerythritol tetraacrylate (PETA), di(trimethylolpropane) tetraacrylate, and dipentaerythritol hexaacrylate (DPEHA).

4. The process of clauses 1-3 wherein the metathesis catalyst is selected from a Grubbs $1^{st}$ generation catalyst, a Grubbs $2^{nd}$ generation catalyst, a Hoveyda-Grubbs catalyst, and a ruthenium-based metathesis catalyst.

5. The process of clauses 1-4 wherein the one or more cyclic olefins and one or more multi-functional (meth)acrylates are present in a molar concentration ratio (cyclic olefin/multi-functional (meth)acrylate) of from 2 and higher, and the metathesis catalyst is present in an amount of from 0.00001 M to 1 M.

6. The process of clauses 1-5 wherein the polymerization is carried out at a temperature between −40° C. to 120° C., at an ambient pressure, and for a time from 3 minutes to 168 hours.

7. A dendritic hydrocarbon polymer produced by the process of clauses 1-6.

8. A process for making a substantially saturated dendritic hydrocarbon polymer by metathesis insertion polymerization, said process comprising:
polymerizing in one step an amount of one or more cyclic olefins and one or more multi-functional (meth)acrylates, said one or more multi-functional (meth)acrylates having a functionality of 3 or higher, in the presence of a metathesis catalyst and under conditions sufficient to produce a dendritic hydrocarbon polymer; and
hydrogenating the dendritic polyolefin to form the substantially saturated dendritic hydrocarbon polymer.

9. The process of clause 8 which is a one pot process.

10. The process of clauses 8 and 9 wherein the dendritic hydrocarbon polymer is a dendritic polyolefin.

11. The process of clauses 8-10 wherein the one or more cyclic olefins are selected from cyclooctene and its derivatives, cyclooctadiene, 1,5-dimethylcyclooctadiene, norbornene and its derivatives, a cyclic olefin with a sufficient ring strain for ring opening metathesis polymerization, and a bicyclic or multicyclic olefin, and the one or more multi-functional (meth)acrylates are selected from trimethylolpropane triacrylate (TMPTA), trimethylolpropane ethoxylate triacrylate, glycerol propoxylate (1PO/OH) triacrylate, 1,3,5-triacryloylhexahydro-1,3,5-triazine, tris[2-(acryloyloxy)ethyl] isocyanurate, pentaerythritol tetraacrylate (PETA), di(trimethylolpropane) tetraacrylate, and dipentaerythritol hexaacrylate (DPEHA).

12. The process of clauses 8-11 wherein the metathesis catalyst is selected from a Grubbs $1^{st}$ generation catalyst, a Grubbs $2^{nd}$ generation catalyst, a Hoveyda-Grubbs catalyst, and a ruthenium-based metathesis catalyst.

13. The process of clauses 8-12 wherein the one or more cyclic olefins and one or more multi-functional (meth)acrylates are present in a concentration ratio (cyclic olefin/multi-functional (meth)acrylate) of from 2 and higher, and the metathesis catalyst is present in an amount of from 0.00001 M to 1 M.

14. The process of clauses 8-13 wherein the polymerization is carried out at a temperature between −40° C. to 120° C., at an ambient pressure, and for a time from 3 minutes to 168 hours, and the hydrogenation is carried out at a temperature between 0° C. to 250° C., at a pressure between ambient to 1000 psi, and for a time from 5 minutes to 72 hours.

15. A substantially saturated dendritic hydrocarbon polymer produced by the process of clauses 8-14.

All patents and patent applications, test procedures (such as ASTM methods, UL methods, and the like), and other documents cited herein are fully incorporated by reference to the extent such disclosure is not inconsistent with this disclosure and for all jurisdictions in which such incorporation is permitted.

When numerical lower limits and numerical upper limits are listed herein, ranges from any lower limit to any upper limit are contemplated. While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

The present disclosure has been described above with reference to numerous embodiments and specific examples. Many variations will suggest themselves to those skilled in this art in light of the above detailed description. All such obvious variations are within the full intended scope of the appended claims.

What is claimed is:

1. A one step process for making a dendritic hydrocarbon polymer by metathesis insertion polymerization, said process comprising:
polymerizing are amount of one or more cyclic olefins and one or more multi-functional (meth)acrylates, said one or more multi-functional (meth)acrylates having a functionality of 3 or higher, in the presence of a metathesis catalyst and under conditions sufficient to produce said dendritic hydrocarbon polymer.

2. The process of claim 1 wherein the dendritic hydrocarbon polymer is a dendritic polyolefin.

3. The process of claim 1 wherein the one or more cyclic olefins are selected from cyclooctene, cyclooctadiene, 1,5-dimethylcyclooctadiene, norbornene, a cyclic olefin with a sufficient ring strain for ring opening metathesis polymerization, and a bicyclic or multicyclic olefin.

4. The process of claim 1 wherein the one or more multi-functional (meth)acrylates are selected from trimethylolpropane triacrylate (TMPTA), trimethylolpropane ethoxylate triacrylate, glycerol propoxylate (1PO/OH) triacrylate, 1,3,5-triacryloylhexahydro-1,3,5-triazine, tris[2-(acryloyloxy)ethyl] isocyanurate, pentaerythritol tetraacrylate (PETA), di(trimethylolpropane) tetraacrylate, and dipentaerythritol hexaacrylate (DPEHA).

5. The process of claim 1 wherein the one or more cyclic olefins and one or more multi-functional (meth)acrylates are present in a molar concentration ratio (cyclic olefin/multi-functional (meth)acrylate) of from 2 and higher.

6. The process of claim 1 wherein the metathesis catalyst is selected from a Grubbs $1^{st}$ generation catalyst, a Grubbs $2^{nd}$ generation catalyst, a Hoveyda-Grubbs catalyst, and a ruthenium-based metathesis catalyst.

7. The process of claim 1 wherein the metathesis catalyst is present in an amount of from 0.00001 M to 1 M.

8. The process of claim 1 wherein the polymerization is carried out at a temperature between −40° C. to 120° C., at an ambient pressure, and for a time from 3 minutes to 168 hours.

9. A dendritic hydrocarbon polymer produced by the process of claim 1.

10. A process for making a substantially saturated dendritic hydrocarbon polymer by metathesis insertion polymerization, said process comprising:
polymerizing in one step an amount of one or more cyclic olefins and one or more multi-functional (meth)acrylates, said one or more multi-functional (meth)acrylates having a functionality of 3 or higher, in the presence of a metathesis catalyst and under conditions sufficient to produce a dendritic hydrocarbon polymer; and
hydrogenating the dendritic polyolefin to form the substantially saturated dendritic hydrocarbon polymer.

11. The process of claim 10 which is a one pot process.

12. The process of claim 10 wherein the dendritic hydrocarbon polymer is a dendritic polyolefin.

13. The process of claim 10 wherein the one or more cyclic olefins are selected from cyclooctene, cyclooctadiene, 1,5-dimethylcyclooctadiene, norbornen, a cyclic olefin with a sufficient ring strain for ring opening metathesis polymerization, and a bicyclic or multicyclic olefin.

14. The process of claim 10 wherein the one or more multi-functional (meth)acrylates are selected from trimethylolpropane triacrylate (TMPTA), trimethylolpropane ethoxylate triacrylate, glycerol propoxylate (1PO/OH) triacrylate, 1,3,5-triacryloylhexahydro-1,3,5-triazine, tris[2-(acryloyloxy)ethyl] isocyanurate, pentaerythritol tetraacrylate (PETA), di(trimethylolpropane) tetraacrylate, and dipentaerythritol hexaacrylate (DPEHA).

15. The process of claim 10 wherein the one or more cyclic olefins and one or more multi-functional (meth)acrylates are present in a concentration ratio (cyclic olefin/multi-functional (meth)acrylate) of from 2 and higher.

16. The process of claim 10 wherein the metathesis catalyst is selected from a Grubbs $1^{st}$ generation catalyst, a Grubbs $2^{nd}$ generation catalyst, a Hoveyda-Grubbs catalyst, and a ruthenium-based metathesis catalyst.

17. The process of claim 10 wherein the metathesis catalyst is present in an amount of from 0.00001 M to 1 M.

18. The process of claim 10 wherein the polymerization is carried out at a temperature between −40° C. to 120° C., at an ambient pressure, and for a time from 3 minutes to 168 hours.

19. The process of claim 10 wherein the hydrogenation is carried out at a temperature between 0° C. to 250° C., at a pressure between ambient to 1000 psi, and for a time from 5 minutes to 72 hours.

20. A substantially saturated dendritic hydrocarbon polymer produced by the process of claim 10.

* * * * *